United States Patent [19]

Budde

[11] Patent Number: 5,719,727
[45] Date of Patent: Feb. 17, 1998

[54] INTERIOR STIFFENING AND HEAD LIFTER RAILS

[75] Inventor: Richard A. Budde, Minnetonka, Minn.

[73] Assignee: Hutchinson Technology Incorporated, Hutchinson, Minn.

[21] Appl. No.: 667,380

[22] Filed: Jun. 21, 1996

Related U.S. Application Data

[63] Continuation of Ser. No. 359,935, Dec. 20, 1994, abandoned, which is a continuation of Ser. No. 1,168, Jan. 7, 1993, abandoned.

[51] Int. Cl.⁶ ............................. G11B 21/12; G11B 21/21
[52] U.S. Cl. ............................................................. 360/104
[58] Field of Search ................................. 360/104, 103, 360/105, 106

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/104 |
| 4,443,824 | 4/1984 | Frater et al. | 360/104 |
| 4,716,478 | 12/1987 | Walsh et al. | 360/104 |
| 4,734,805 | 3/1988 | Yamada et al. | 360/104 |
| 4,853,811 | 8/1989 | Brooks et al. | 360/103 |
| 4,933,791 | 6/1990 | Cheng | 360/104 |
| 4,996,616 | 2/1991 | Aoyagi et al. | 360/104 |
| 5,003,420 | 3/1991 | Hinlein | 360/104 |
| 5,027,240 | 6/1991 | Zarouri et al. | 360/104 |
| 5,027,241 | 6/1991 | Hatch et al. | 360/105 |
| 5,065,268 | 11/1991 | Hagen | 360/104 |
| 5,079,660 | 1/1992 | Yumura et al. | 360/104 |
| 5,081,553 | 1/1992 | Wanlass et al. | 360/103 |
| 5,142,424 | 8/1992 | Hatamura | 360/103 |
| 5,166,846 | 11/1992 | Shigemoto | 360/104 |
| 5,225,949 | 7/1993 | King et al. | 360/104 |
| 5,225,950 | 7/1993 | Crane | 360/104 |
| 5,291,359 | 3/1994 | Wolter | 360/104 |
| 5,299,081 | 3/1994 | Hatch et al. | 360/104 |

FOREIGN PATENT DOCUMENTS

| | | | |
|---|---|---|---|
| 58-185062 | 10/1983 | Japan . | |
| 60-226080 | 11/1985 | Japan | 360/104 |
| 61-122978 | 6/1986 | Japan . | |
| 62-279570 | 12/1987 | Japan . | |
| 63-144473 | 6/1988 | Japan . | |
| 162877 | 3/1989 | Japan | 360/104 |
| 64-62877 | 3/1989 | Japan . | |
| 9209076 | 5/1992 | WIPO | 360/104 |

Primary Examiner—Stuart S. Levy
Assistant Examiner—William J. Klimowicz
Attorney, Agent, or Firm—Faegre & Benson LLP

[57] ABSTRACT

A load beam element is provided with stiffening and load lifter rails fashioned by making a cut-out or incised flap from a continuous surface of the load beam element and bending the flap out of the plane of the load beam element surface. These stiffening and load lifter rails project from the plane of the load beam surface over at least a portion of the length of the load beam element and are each oriented in length generally parallel to the nearest edge of the load beam. In addition to providing stiffening of the load beam, the rails also provide a surface for contact by a head lifter apparatus to lift and lower the HSA toward and away from an appropriate disk surface.

19 Claims, 4 Drawing Sheets

INTERIOR STIFFENING AND HEAD LIFTER RAILS

This is a Continuation of application Ser. No. 08/359,935, filed Dec. 20, 1994, now abandoned, which is a Continuation of application Ser. No. 08/001,168, filed Jan. 7, 1993, now abandoned.

BACKGROUND OF THE INVENTION

The present invention relates to an improved head suspension assembly (HSA) for use in dynamic storage devices or rigid disk drives. More specifically, this invention is directed to certain improvements in the construction of a load beam of an HSA by providing stiffening flanges on an interior of a surface of the load beam, rather than only on perimeter edges thereof.

The presence of stiffening rails on perimeter longitudinal edges of the load beam has been important in conventional HSAs to provide required rigidity to the length of the load beam between the substantially resilient proximal portion of the load beam element adjacent the portion of the load beam attached to the rigid actuator arm of the E-block of the disk drive and the distal tip end of the load beam.

Various types of stiffening means have been proposed to lend the required rigidity to the length of the load beam, including rails formed at the perimeter of the load beam to be bent either toward or away from the read/write head (such as U.S. Pats. Nos. 3,931,641, 4,734,805, 4,853,811, 4,933, 791, 5,003,420, 5,027,240, 5,027,241, 5,079,660 and 5,081,553), as well as stiffening structures to be formed on the surface of the load beam itself (such as U.S. Pats. Nos. 4,443,824, 4,996,616, 5,065,268, 5,131,871, and 5,166, 846). Although many of these prior stiffening means have proved useful in terms of providing the necessary load beam stiffness, they all have presented inherent difficulties as well.

Providing rails oriented toward the read/write head side of the load beam, particularly rails which extend to the distal tip end of the load beam (or to the distal tip end of the flexure in HSAs having the flexure formed as an integral part of the load beam), interferes with proper hub clearance in accessing disks within the disk drive. If the load beam is configured with rails oriented away from the read/write head side of the load beam, the mere presence of the rails on the surface of the load beam adds to the thickness of the HSA. The additional load beam thickness must be adjusted for in raising and lowering the HSA toward and away from the associated disk. Providing stiffening structures on the load beam itself adds to the cost and to the additional tooling steps required in forming the HSA.

BRIEF DESCRIPTION OF THE INVENTION

The present invention provides a novel HSA for attachment to a rigid actuator arm of a disk drive. The HSA comprises a load beam element and a flexure. The load beam element is joined to a proximal end of the arm, and the load beam element is substantially resilient at a proximal portion of the load beam and substantially rigid for a remaining length of the load beam. The load beam element is provided with stiffening rails which are formed by making a cut-out to provide an incised flap in a continuous surface of the load beam element and bending that flap out of the plane of the load beam element surface. The resultant flaps form stiffening rails which project from the plane of the load beam surface over at least a portion of the length of the load beam element and are each oriented generally parallel to the nearest edge of the load beam. The cut-out on the load beam may be made by etching or any other suitable process. In addition to functioning as stiffening rails, the edges of the flaps also provide a surface for contact with head lifter apparatus to lift and lower the HSA toward and away from an appropriate disk surface.

A gimballing flexure portion is provided at a distal end of the load beam element, and may be of any suitable known type. Generally, the flexure has an aperture therein to define at least a pair of conjoined outer flexible arms. The flexure portion also includes a flexure tongue joined to the flexible arms and extending into the aperture with a free end of the tongue centrally located within the arms. The flexure portion may be a separate element attached to the load beam or the flexure and load beam may be formed as one unitary element.

DETAILED DESCRIPTION OF THE INVENTION

Figure 1:
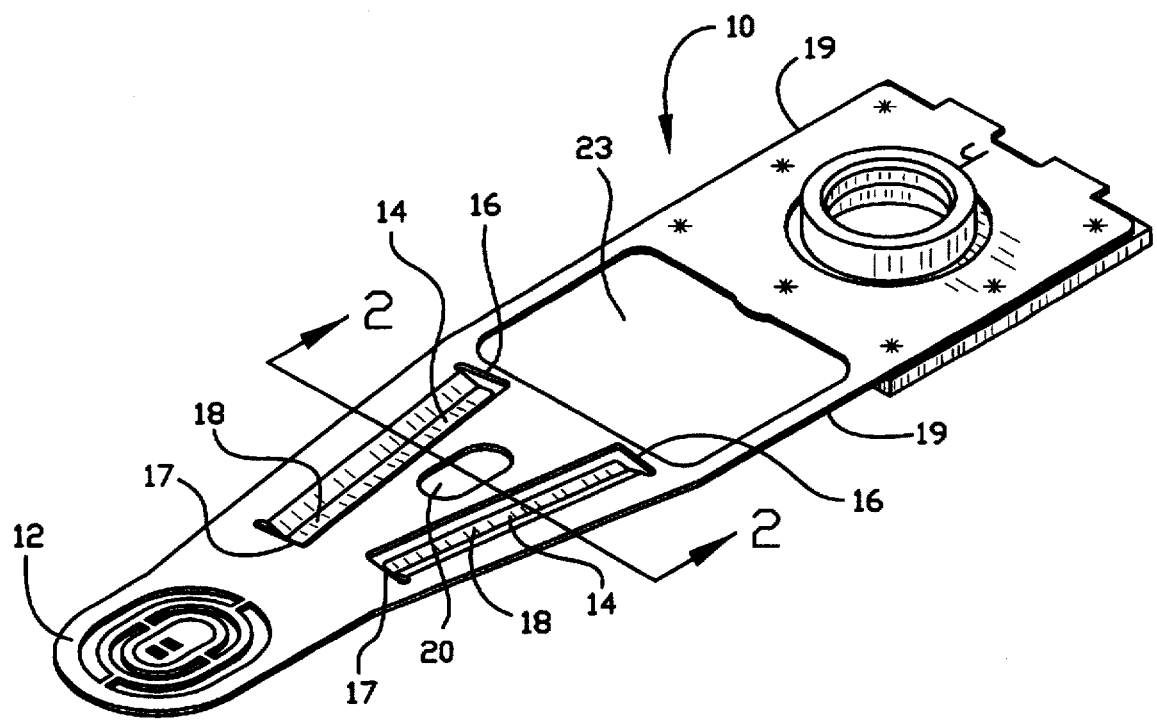
FIG. 1 is a top perspective view of an HSA incorporating interior stiffening and head lifter rails of the present invention.
Figure 2:
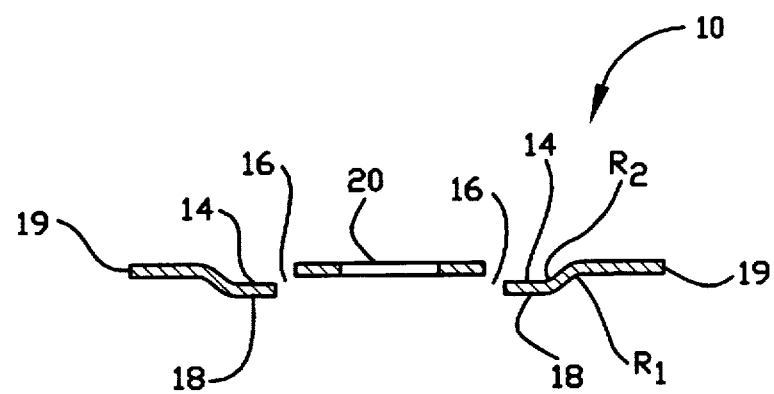
FIG. 2 is a section view of the HSA of FIG. 1, taken along the line 2—2 and showing a detail of the formed interior surface stiffening and head lifter rails.

Load beam 10, with unitary integral flexure portion 12 formed therein, is illustrated in FIGS. 1 and 2. The interior stiffening and head lifter rails 14 are shown as flaps cut into a continuous surface of an interior portion of the load beam 10 itself. Thus, an elongated generally U-shaped cut 16 is patterned into load beam 10, for example, by etching, to define the perimeter of flap 18. Flap 18 is then bent out of the plane of the surface of load beam element 10. Flap 18 is preferably bent about a radius contour $R_1$ to project toward the side of the load beam element 10 to which a read/write head (not shown) will be mounted, although forming of rails 14 to project away from the read/write head side of the load beam element 10 is also possible. Flap 18 may also be bent a second time about a radius contour $R_2$ to lie in a plane generally parallel to the plane of the surface of load beam 10. The ends of the U-shaped etch or incision 16 are positioned so that each formed rail 14 is oriented generally parallel to the closest adjacent side 19 of load beam 10.

If desired, the area of load beam 10 between rails 14 may be provided with tooling or locating features or apertures 20, as are conventional in the art. It is important, however, that a sufficient amount of material must remain in the area of load beam 10 between the length of rails 14 to provide needed lateral stiffness, as well as providing for positioning of tooling or locating features or apertures as needed. Also, if desired, load beam 10 may be provided with cut-out area 23 to reduce the spring rate of the load beam, as known in this art.

The following specific parameters have been found suitable for a preferred embodiment of an HSA manufactured for use with the industry standard so-called "50%" slider, incorporating interior stiffening and head lifter rails 14 of the present invention as described with reference to FIGS. 1 and 2. All linear dimensions, unless indicated otherwise, are given in millimeters, with linear dimension tolerances of ±0.10. The distance from the centerline axis of load beam 10 to the first bend of rail 14 is 1.18 and the distance from the centerline axis of load beam 10 to the second bend of rail 14 is 0.93. The distance below the surface of load beam 10 of the portion of rail 14 which lies in a plane parallel to the plane of load beam 10 is 0.2. The radius of curvature $R_1$ and $R_2$ for each bend of each rail 14 is 0.1.

Figure 3:
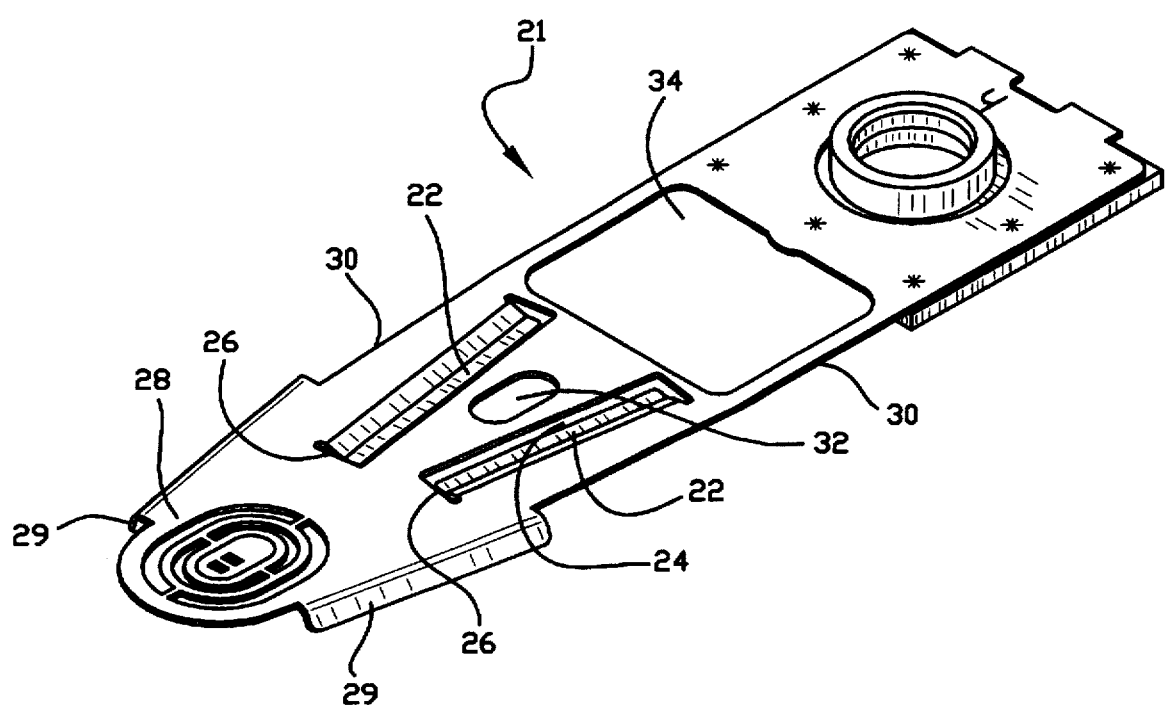
FIG. 3 is a top perspective view of an alternative embodiment of an HSA incorporating interior stiffening and head lifter rails of the present invention, in conjunction with perimeter stiffening rails.

FIG. 3 illustrates an alternative embodiment of load beam 21 formed with interior stiffening and lifter rails 25. Elongated generally U-shaped etch or cut 24 is patterned into load beam 21, defining flap 22. Flap 22 is then bent out of the plane of the surface of load beam element 21. Flap 22 is preferably bent about a radius contour to project toward the side of the load beam element 21 to which a read/write head (not shown) will be attached, although forming of rails 25 to project away from the read/write head side of the load beam element 21 is also possible. Flap 22 is also bent a second time about a radius contour to lie in a plane generally parallel to the plane of the surface of load beam 21. Both bends can be part of a one step forming process. The ends of the U-shaped etch or incision 26 are positioned so that each formed rail 25 is oriented generally parallel to the closest adjacent side 30 of load beam 21.

As has been described above with reference to the HSA of FIG. 3, the area of load beam 21 between rails 25 may be provided with tooling or locating features or apertures 32, as long as a sufficient amount of material remains in this area to provide needed lateral stiffness. As shown in FIG. 3, load beam 21 in the region of flexure 28 may be also formed with side rails 29, which may slightly overlap in length the length of interior stiffening and load lifter rails 25. Also, if desired, load beam 21 may be provided with cut-out area 34 to reduce the spring rate of the load beam, as known in this art.

Figure 4:
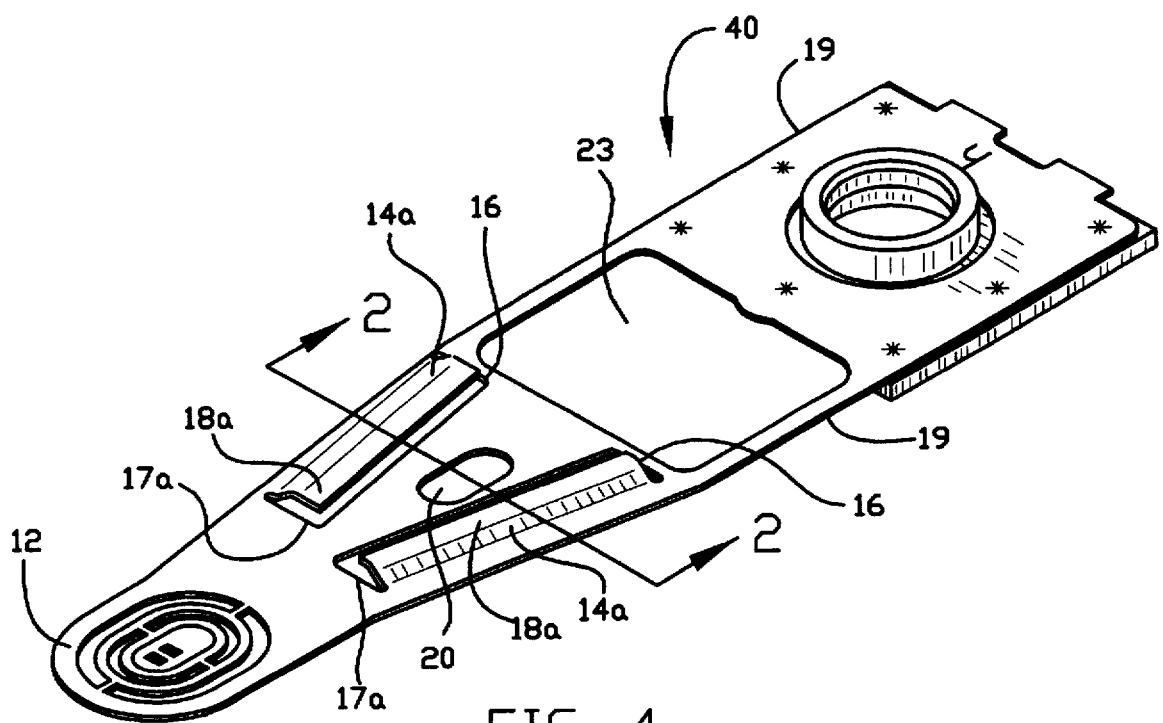
FIG. 4 is a top perspective view of an embodiment of an HSA of this invention in which the interior stiffening rails project away from the surface of the disk.

Load beam 40, with unitary integral flexure portion 12 formed therein, is illustrated in FIG. 4. The interior stiffening rails 14a are shown as flaps cut into a continuous surface of an interior portion of the load beam 40 itself. Thus, an elongated generally U-shaped cut 16 is patterned into load beam 40, for example, by etching, to define the perimeter of flap 18a. Flap 18a is then bent out of the plane of the surface of load beam element 40. Flap 18a is bent about a radius of contour $R_1$ to project away from the side of the load beam element 40 to which a read/write head (not shown) will be mounted. Flap 18a may also be bent a second time about a radius contour $R_2$ to lie in a plane generally parallel to the plane of the surface of load beam 40. The ends of the U-shaped etch or incision 16 are positioned so that each formed rail 14a is oriented generally parallel to the closest adjacent side 19 of load beam 40.

If desired, the area of load beam 40 between rails 14a may be provided with tooling or locating features or apertures 20, as are conventional in the art. It is important, however, that a sufficient amount of material must remain in the area of load beam 40 between the length of rails 14a to provide needed lateral stiffness, as well as providing for positioning of tooling or locating features or apertures as needed. Also, if desired, load beam 40 may be provided with cut-out area 23 to reduce the spring rate of the load beam 40, as known in this art.

Figure 5:
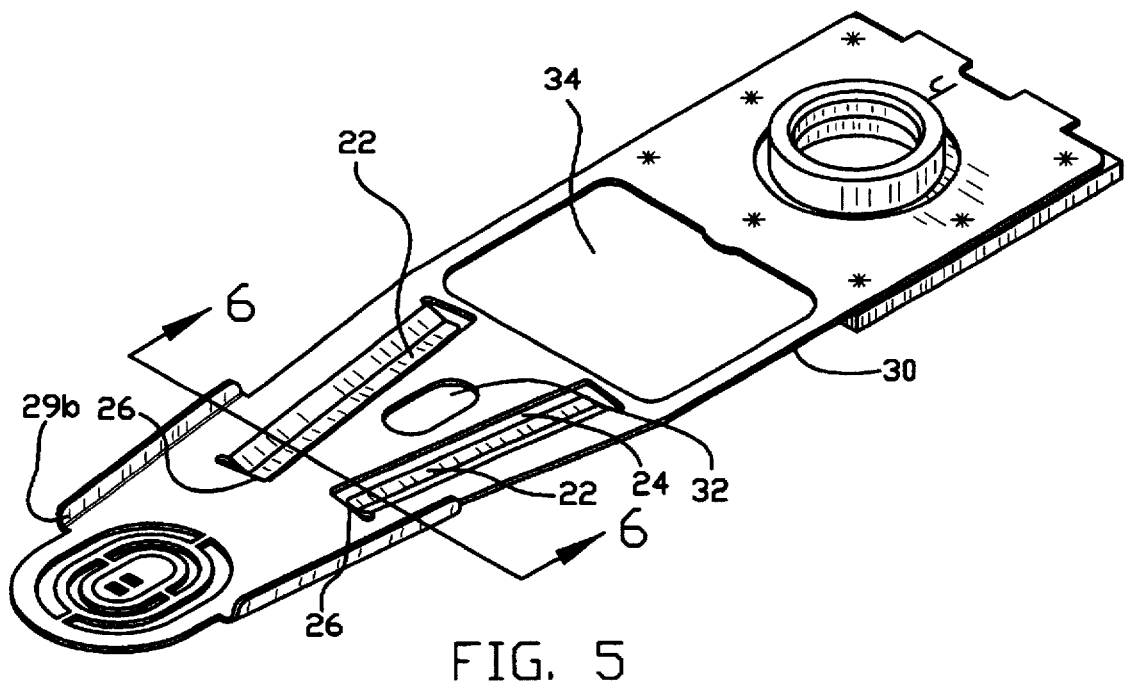
FIG. 5 is a top perspective view of an embodiment of an HSA of this invention in which the perimeter stiffening flanges are bent around a radius contour toward a surface of the load beam element to which a read-write head is to be mounted.
Figure 6:
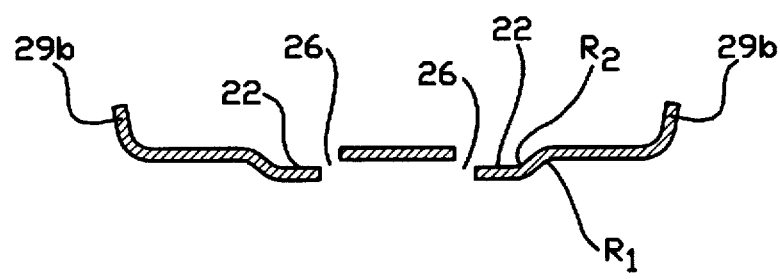
FIG. 6 is a section view of the HSA of FIG. 5, taken along the line 6—6.

FIGS. 5 and 6 illustrate another alternative embodiment of load beam 50 formed with interior stiffening and lifter rails 22. Elongated generally U-shaped etch or cut 24 is patterned into load beam 50, defining flap 22. Flap 22 is then bent out of the plane of the surface of load beam element 50. Flap 22 is bent about a radius contour to project away from the read/write head side of the load beam element 50. Flap 22 is also bent a second time about a radius contour to lie in a plane generally parallel to the plane of the surface of load beam 50. Both bends can be part of a one step forming process. The ends of the U-shaped etch or incision 26 are positioned so that each formed rail 22 is oriented generally parallel to the closest adjacent side 30 of load beam 50.

As has been described above with reference to the HSAs of FIGS. 1, 3 and 4, the area of load beam 50 between rails 22 may be provided with tooling or locating features or apertures 32, as long as a sufficient amount of material remains in this area to provide needed lateral stiffness. As seen in FIGS. 5 and 6, load beam 50 in the region of flexure 28 may be also formed with side stiffening flanges 29b, which may slightly overlap in length the length of interior stiffening and load lifter rails 22. The side stiffening flanges 29b extend from the flexure portion 28 of the load beam element 50 to slightly past a distal terminus of the interior stiffening rails 22 and are bent around a radius contour to project away from a surface of the load beam element 50 to which a read/write head (not shown) is to be mounted. Also, if desired, load beam 50 may be provided with cut-out area 34 to reduce the spring rate of the load beam 50, as known in this art.

Interior stiffening and load lifter rails 14, 25 of the present invention may be incorporated into a variety of HSAs having differing types of flexures and other components. In forming rails 14, 25, if desired, distal leg 17, 26 of U-shaped cut 16, 24 may be angled slightly toward flexure 12, 28 tip end of load beam 10, 21, to open the angle of the end toward the distal end of the load beam 10, 21. Note that, due to angling leg 17, 26 in this manner, rails 14, 25 are able to extend over a longer length of load beam 10, 21, while avoiding interference with tooling holes 20, 32 and other features of flexure 12, 28 region. Also, when flap 18, 22 is bent a second time about a radius contour, it may be oriented to project slightly toward load beam 10, 21. The specific dimensions of other types of load beams than those particularly mentioned herein above can be readily determined by one of skill in this art. Dimensional variations from those specifically given herein are determined by the drive features (such as hub clearance, etc.) in conjunction with which the load beam is used, as is known in the art.

The interior stiffening and load lifter rails of the present invention demonstrate significant advantages in the following ways. By forming the stiffening and load lifter rails on the interior of the load beam, rather than on the edge of the load beam, the load beam itself can be made narrower, thus allowing for better hub clearance in accessing respective disks within the disk drive. Also, by placing the lifter rails closer to the load beam center line, more precise lifting of the load beam is facilitated without any unwanted tilting, flexing or bending of the load beam. Further, by avoiding the necessity of rails on perimeter edges of the load beam, the entire mass of the load beam is decreased. Even if ancillary perimeter rails are also used (as illustrated in FIG. 3), decreased overall mass of the load beam is still achieved over load beams using longer length perimeter rails alone.

What is claimed is:

1. A head suspension adapted for attachment to a rigid arm, said head suspension comprising, in combination:

a) a load beam element adapted to be joined to a proximal end of the arm, said load beam element including a resilient spring region at a proximal portion and a rigid region for a remaining length thereof, the load beam element having a planar surface, the planar surface having a perimeter edge surrounding an interior, the perimeter edge having two opposed segments coplanar with the remainder of the load beam planar surface and free from edge rails, the planar surface further having a pair of transversely spaced and elongated stiffening rails extending along a substantial length of the rigid region, each rail configured from an elongated flap and formed wholly within the interior of said load beam element perimeter edge such that a portion of the planar surface remains between the two elongated flaps, a first section of each elongated flap being rectangular and planar and remaining in connection with the load beam element planar surface along a single edge of the first section adjacent to one of the opposed segments of the load beam perimeter edge, each said elongated flap having a first bend along the single edge connecting the first section to the load beam element to position the first section of each flap to project away from said load beam element at an acute angle, and a second bend such that a second rectangular and planar section of each elongated flap forms an obtuse angle with the first section of each elongated flap; and b) a gimballing flexure portion at a distal end of the load beam element.

2. A head suspension according to claim 1, wherein the flexure portion is formed in one piece with the load beam element.

3. A head suspension according to claim 1, wherein the first section of each elongated flap projects away from the load beam element and towards the other elongated flap and further wherein the second section of each elongated flap is positioned in a plane generally parallel to the load beam element planar surface.

4. A head suspension according to claim 1, wherein each second section of each elongated flap is positioned to project toward the load beam.

5. A head suspension according to claim 1, wherein each opposed segment of the perimeter edge is linear such that the length of each stiffening rail is oriented generally parallel to the opposed segment of the perimeter edge nearest to the stiffening rail.

6. A head suspension according to claim 1, and further including at least one aperture in the load beam element between the stiffening rails, wherein there is a sufficient area of load beam element planar surface between the length of the stiffening rails to provide needed lateral stiffness to the load beam element and to provide surface for positioning of locating apertures.

7. A head suspension according to claim 1, wherein the stiffening rails project toward a surface of a disk to be accessed by a read-write head mounted to the flexure portion, and are further adapted and arranged to function as load lifter rails.

8. A head suspension according to claim 1, wherein the stiffening rails project away from a surface of a disk to be accessed by a read-write head mounted to the flexure portion.

9. In a disk drive for positioning transducer heads at selected locations on respective surfaces of axially mounted rotatable disk media, a head suspension adapted for attachment to a rigid actuator arm of said disk drive, said head suspension comprising, in combination:

a) a load beam element adapted to be joined to a proximal end of the arm, said load beam element including a resilient spring region at a proximal portion and a rigid region for a remaining length thereof, the load beam element having a planar surface, the planar surface having a perimeter edge surrounding an interior, the perimeter edge having two opposed segments coplanar with the remainder of the load beam planar surface and free from side rails, the planar surface further having a pair of transversely spaced and elongated stiffening rails extending along a substantial length of the rigid region, each rail configured from an elongated flap and formed wholly within the interior of said load beam element perimeter edge such that a portion of the planar surface remains between the two elongated flaps, a first section of each elongated flap being rectangular and planar and remaining in connection with the load beam element planar surface along a single edge of the first section adjacent to one of the opposed segments of the load beam perimeter edge, each said elongated flap having a first bend along the single edge connecting the first section to the load beam element to position the first section of each flap to project away from said load beam element at an acute angle, and a second bend such that a second rectangular and planar section of each elongated flap forms an obtuse angle with the first section of each elongated flap; and b) a gimballing flexure portion at a distal end of the load beam element.

10. A head suspension according to claim 9, wherein the flexure portion is formed in one piece with the load beam element.

11. A head suspension according to claim 10, wherein a portion of the load beam element between the stiffening rails is reduced in mass.

12. A head suspension according to claim 9, wherein the first section of each elongated flap projects away from the load beam element and towards the other elongated flap and further wherein the second bend positions the second section of each elongated flap in a plane generally parallel to the load beam element planar surface.

13. A head suspension according to claim 9 wherein each opposed segment of the perimeter edge is linear such that the stiffening rail is oriented generally parallel to the opposed segment of the perimeter edge nearest to the stiffening rail.

14. A head suspension according to claim 9, and further including at least one aperture in the load beam element between the stiffening rails wherein there is a sufficient area of planar load beam element surface between the length of the stiffening rails to provide needed lateral stiffness to the load beam element and to provide surface for positioning of locating or tooling apertures or features.

15. A head suspension according to claim 9, wherein the stiffening rails project toward a surface of a disk to be accessed by a read-write head mounted to the flexure portion.

16. A head suspension according to claim 9, wherein the stiffening rails project away from a surface of a disk to be accessed by a read-write head mounted to the flexure portion.

17. A head suspension according to claim 9, wherein separate exterior stiffening flanges are further formed projecting from the opposed segments of the perimeter edge of the load beam element.

18. A head suspension according to claim 17, wherein the stiffening flanges extend from a distal tip of the flexure portion of the load beam element to slightly past a distal terminus of the interior stiffening rails and are bent around a radius contour to project toward a surface of the load beam element to which a read-write head is to be mounted.

19. A head suspension according to claim 17 wherein the stiffening flanges extend from a distal tip of the flexure portion of the load beam element to slightly past a distal terminus of the interior stiffening rails and are bent around a radius contour to project away from a surface of the lead beam element to which a read-write head is to be mounted.

* * * * *

UNITED STATES PATENT AND TRADEMARK OFFICE
CERTIFICATE OF CORRECTION

PATENT NO. : 5,719,727
DATED : February 17, 1998
INVENTOR(S) : Budde

It is certified that error appears in the above-indentified patent and that said Letters Patent is hereby corrected as shown below:

In column 5, line 11, after the word "beam" insert --element--.

In column 5, line 44, after the word "beam" insert --element--.

In column 6, line 13, after the word "beam" insert --element--.

Signed and Sealed this

Second Day of June, 1998

Attest:

BRUCE LEHMAN

Attesting Officer

Commissioner of Patents and Trademarks